US011103099B2

(12) United States Patent
Iacobucci et al.

(10) Patent No.: US 11,103,099 B2
(45) Date of Patent: Aug. 31, 2021

(54) BEVERAGE DISPENSING MACHINE

(71) Applicant: Iacobucci HF Aerospace S.p.A., Ferentino (IT)

(72) Inventors: Lucio Iacobucci, Ferentino (IT); Maurizio Ruspantini, Ferentino (IT); Massimiliano Marcoccia, Ferentino (IT); Roberto Mariani, Ferentino (IT)

( * ) Notice: Subject to any disclaimer, the term of this patent is extended or adjusted under 35 U.S.C. 154(b) by 609 days.

(21) Appl. No.: 15/561,490

(22) PCT Filed: Apr. 7, 2016

(86) PCT No.: PCT/IT2016/000087
§ 371 (c)(1),
(2) Date: Sep. 25, 2017

(87) PCT Pub. No.: WO2016/166778
PCT Pub. Date: Oct. 20, 2016

(65) Prior Publication Data
US 2018/0064282 A1 Mar. 8, 2018

(30) Foreign Application Priority Data

Apr. 14, 2015 (IT) .......................... RM2015A000159

(51) Int. Cl.
*A47J 31/06* (2006.01)
*A47J 31/44* (2006.01)
*A47J 31/40* (2006.01)

(52) U.S. Cl.
CPC ............ *A47J 31/061* (2013.01); *A47J 31/40* (2013.01); *A47J 31/4425* (2013.01); *A47J 31/4457* (2013.01)

(58) Field of Classification Search
CPC .. A47J 31/061; A47J 31/0605; A47J 31/0631; A47J 31/0642; A47J 31/0684;
(Continued)

(56) References Cited

U.S. PATENT DOCUMENTS 2,875,011 A * 2/1959 Higberg ................ E05B 65/462
312/218
4,949,627 A * 8/1990 Nordskog ............. A47J 31/005
99/281

(Continued)

FOREIGN PATENT DOCUMENTS

CA          2121998         10/1995

OTHER PUBLICATIONS

Webster definition to "ball" (Year: 2020).*
Webster definition to "perforated" (Year: 2020).*
Definition to "spiral" (Year: 2020).*

*Primary Examiner* — Phuong T Nguyen
*Assistant Examiner* — Bonita Khlok
(74) *Attorney, Agent, or Firm* — Themis Law

(57) ABSTRACT

A beverage dispensing machine designed for aircraft use has compact dimensions, is low-weight and satisfies the safety requirements and standards applicable in that sector. The beverage dispensing machine can dispense both large quantities of a beverage, such as 1.6 liters of American coffee or tea, inside a jug positioned inside an appropriate seat, and smaller quantities of hot water (typically 150 ml), which can be used to prepare beverages, via a nozzle situated on the outside thereof. In one embodiment, the beverage dispensing machine includes a bottom jug retention system having a locking lever hinged on spiral seats to keep the jug stationary during the dispensing of the beverage.

9 Claims, 10 Drawing Sheets

(58) Field of Classification Search
CPC .... A47J 31/40; A47J 31/4425; A47J 31/4457; A47J 27/21041; A47J 27/21166; A47J 27/2105
USPC ....... 99/285, 295, 293, 300, 323; 312/334.7, 312/404, 246, 248
See application file for complete search history.

(56) References Cited

U.S. PATENT DOCUMENTS

| | | | |
|---|---|---|---|
| 6,309,038 B1 * | 10/2001 | Domenig | A47B 46/005 312/246 |
| 6,779,435 B1 * | 8/2004 | Iacobucci | A47J 31/005 392/449 |
| 7,591,218 B2 * | 9/2009 | Bunn | A47J 31/06 99/295 |
| 2006/0011069 A1 | 1/2006 | Spencer | |
| 2008/0173181 A1 | 7/2008 | Startz | |
| 2011/0061542 A1 * | 3/2011 | Jimenez | A47J 31/407 99/300 |
| 2013/0305932 A1 | 11/2013 | Epars | |
| 2014/0120223 A1 | 5/2014 | Boubeddi | |
| 2014/0251151 A1 | 9/2014 | Cao | |

* cited by examiner

BEVERAGE DISPENSING MACHINE

TECHNICAL FIELD OF THE INVENTION

The present invention relates a beverage dispensing machine. The machine has been designed for aircraft, has compact dimensions, is low-weight and is designed to satisfy all the safety requirements and standards applicable in the sector. It is able to dispense large quantities of a beverage, such as 1.6 litres of water for American coffee (filter/brewed coffee) or tea, inside a jug positioned inside the appropriate seat, as well as smaller quantities of hot water (typically 150 ml) via the nozzle situated on the outside thereof.

The machine has been designed for aircraft and therefore for the aviation sector, but may also be used in other areas.

PRIOR ART

The document US 2014/120223 describes a modular machine for dispensing beverages, suitable for capsules of different shape and size from each other.

The document CA 2,121,998 describes a machine for dispensing beverages, characterized by a lever system for closing the top compartment comprising a movable pin and a spring.

The document US 2008/173181 describes a machine for dispensing beverages, in which the dispensing chamber can be completely extracted so as to facilitate the filling and emptying thereof.

The document US 2006/011069 describes a coffee machine which is equipped with a temperature control device for the water entering the dispensing chamber and comprises a system for checking the presence of a container inside which the coffee is to be dispensed.

To the knowledge of the inventors beverage dispensing machines with the characteristic features of the present machine have not been described.

SUMMARY OF THE INVENTION

The present invention relates to a coffee machine able to dispense continuously beverages in an entirely safe manner and very simply from an operational point of view. The machine comprises:
a) a compact water heating system;
b) an extractable drawer for housing pods of American coffee, provided with anti-drip device;
c) a device for closing the coffee extraction chamber designed so that there is no need to use handles and/or hydraulic closing systems and/or any safety locking device;
d) a device for closing the jug during dispensing which does not require activation by the user and has an integrated overflow system;
e) a jug retention device with quick-release button;
f) a piezoelectric keypad for activating the functions.

In connection with the invention, the devices of the machine use advantageously resilient means which are preferably in the form of springs, so that the term "springs" is understood as meaning any type of resilient means suitable for the intended function.

BRIEF DESCRIPTION OF THE FIGURES

In order to facilitate understanding of the invention, the attached figures show a non-limiting example of the invention in which.

DETAILED DESCRIPTION OF THE INVENTION

Figure 1:
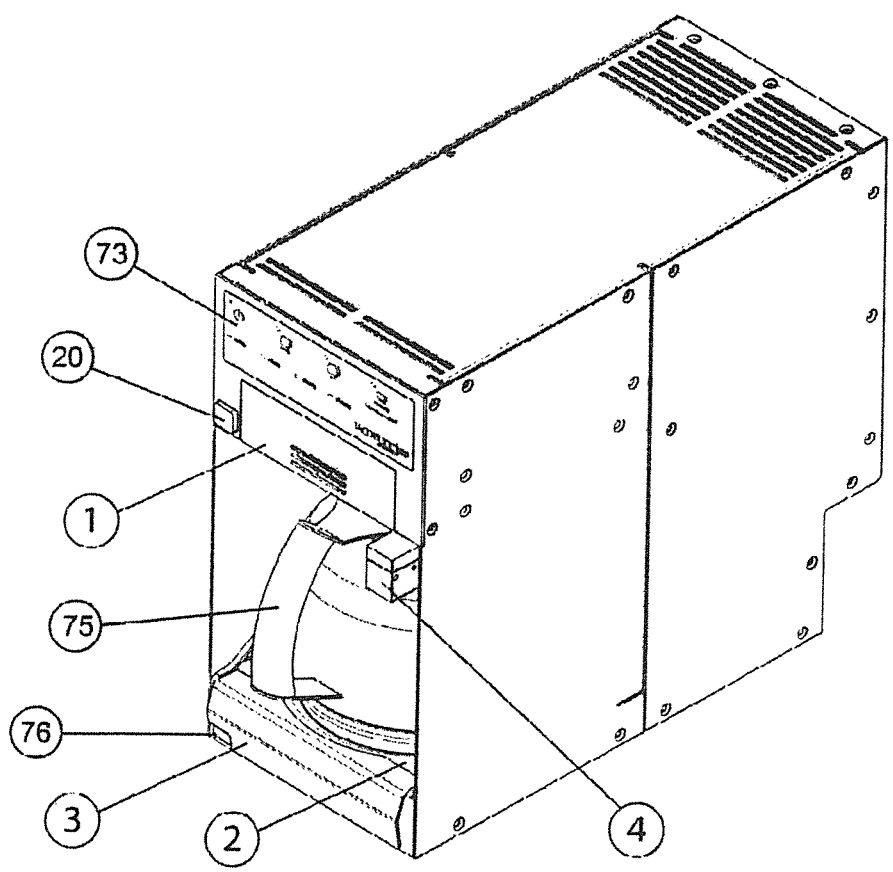
FIG. 1 shows a schematic prospective view of the machine unit.

The coffee machine according to the invention is able to perform the instantaneous and continuous dispensing of hot water for the preparation of beverages. Selection of the beverage is performed by means of the keypad (73) positioned on the front of the machine and, if all the operating and safety conditions are satisfied (presence of jug, presence of drawer, working temperature, etc.), dispensing is activated. In particular:

in order to prepare coffee, a pod must be inserted inside the drawer (1), the jug (or carafe) (75) must be inserted in the appropriate seat (2), the jug must be locked with the jug locking device (3) and the corresponding function button on the keypad (73) must be pressed.

in order to prepare tea, the jug (75) must be inserted in the appropriate seat (2), the jug must be locked with the jug locking device (3) and the corresponding function button on the keypad (73) must be pressed.

In order to prepare hot water, the container (cup or glass) must be positioned underneath the external nozzle (4) and the corresponding function key pressed on the keypad (73).

Below all the most important functional parts of the machine will be analyzed and explained also with the aid of the attached figures.

Extractable Pod-holder Drawer

Figure 2:
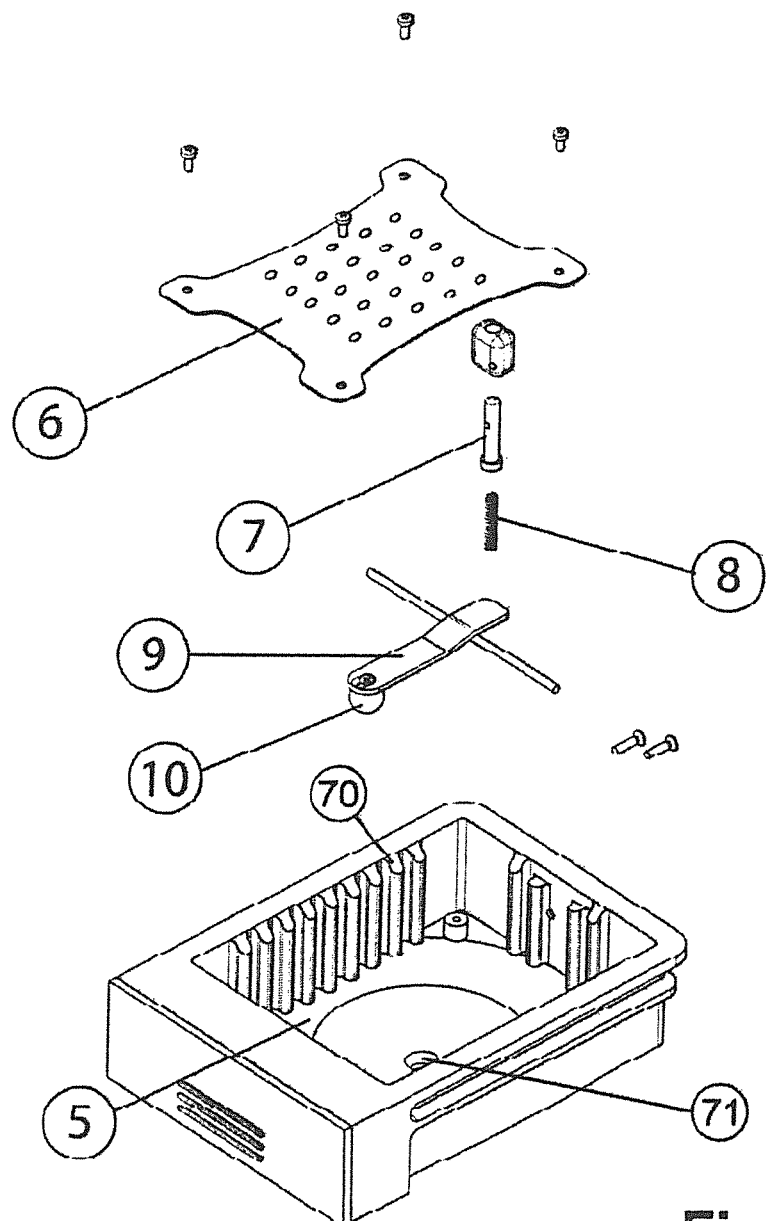
FIG. 2 shows a schematic, perspective, exploded view of the parts which form the extractable drawer with anti-drip system.

The drawer (1) is used to hold a pod (not shown), for example for American coffee, which is then supplied with hot water dispensed by a heater (not shown) for reconstitution of the beverage. The beverage thus reconstituted passes through the outlet hole (71) located on the bottom of the drawer and reaches the jug (75). The drawer (1) cooperates with a lever system (shown in FIG. 2) which allows the outlet hole (71) for the beverage (tea or coffee depending on the type of pod used) to be kept open when the drawer (1) is inserted inside the machine, and to be closed, automatically when the drawer is extracted, preventing the discharging, also of an accidental nature, of liquids when the drawer is open and preventing the residual beverage from spilling out and soiling the galley.

The parts which make up the drawer (1) and the associated lever system are as follows:

a) drawer (1) with holder seat (5) provided with grooves (70) for favouring percolation of the hot water through the pod;
b) perforated bottom filter (6) on which the pod rests once it has been inserted inside the drawer (5);
c) movable pin (7) with spring (8) for moving the lever system with anti-drip function;
d) arm (9) which is provided at one of its ends with a ball (10) for closing off the liquid outlet hole (71).

In detail, the operating principle of the anti-drip system is now described.

In the open condition of the drawer (1), i.e. when it is extracted from the machine, the pin (7) by means of the spring (8) pushes against the arm (9) on the opposite side to where ball (10) is located and causes the ball to close the hole (71), preventing the outflow of liquids. In turn the arm (9) is kept in position by elements (9a) inserted in a pair of grooves (70) opposite each other.

The drawer (1) is movable slidably on guides (12) which cooperate with grooves (12a) provided laterally on the drawer (1).

When the drawer (1) is inserted in the machine, causing it to slide on the guides (12), it reaches a mechanical stop, essentially corresponding to the end-of-travel of the drawer, and the pin (7) is pushed downwards; consequently the arm (9) is raised, moving upwards the ball (10) for closing the hole (71), which is thus open, so as to allow dispensing of the beverage into the jug (75).

System for Closing the Coffee Extraction Chamber

This machine has been designed with a novel system for the coffee extraction chamber such that it is possible to eliminate the handle, which is typically present in aviation applications and often poses problems in that it projects outwards.

The system for closing the drawer (1) is formed by a set of movable guides, a top spray plate and locking latch.

The operating principle of the various parts is now described. Once the pod of coffee has been introduced into the compartment (5) of the drawer (1), the latter is inserted into the machine by means of sliding on the movable guides (12) described below. When pushed with a hand, the drawer (1) is moved upwards by the movable guides (12) which are forced to follow the curved progression of the slot (13a) by means of a rocker arm movement lever (13). In this way, the drawer (1) reaches an upper end-of-travel stop and engages integrally with the support plate (15) and the top spray plate (17) which are provided with a seal (16), so as to seal off the extraction chamber.

Still in the end-of-travel position, and therefore with the drawer closed, a locking device (20) of the latch type is provided and has a pin which is inserted inside a corresponding receiving hole (19a) provided laterally on one side of the drawer, which is therefore locked in the closed position.

If dispensing is required by the user, the hot water will enter into the top spray plate (17) and from here will pass through the pod, the grooves (70) of the drawer favouring the flow of the water which will flow out through the hole (71) into the jug (75).

Figure 3:
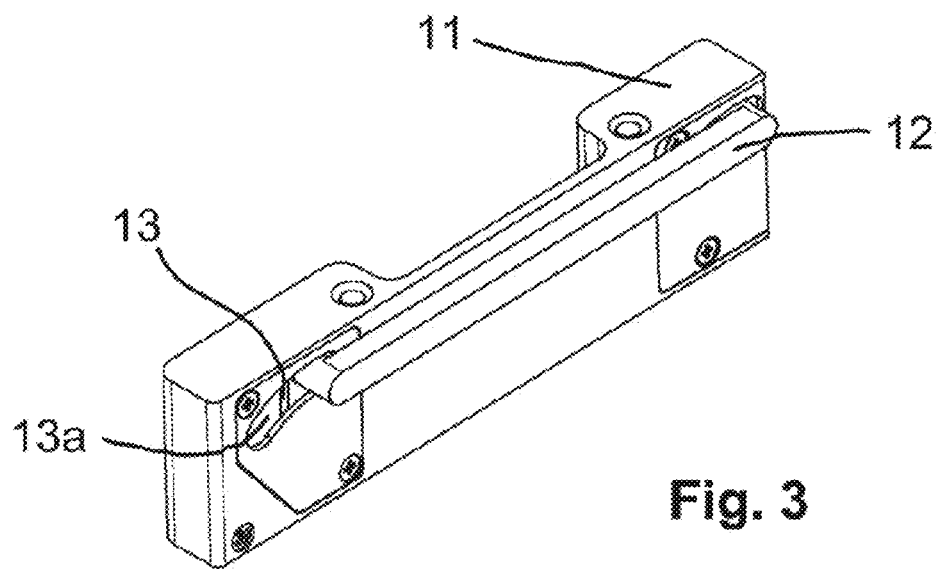
FIG. 3 shows a schematic perspective view of the movable guide of the drawer.
Figure 6:
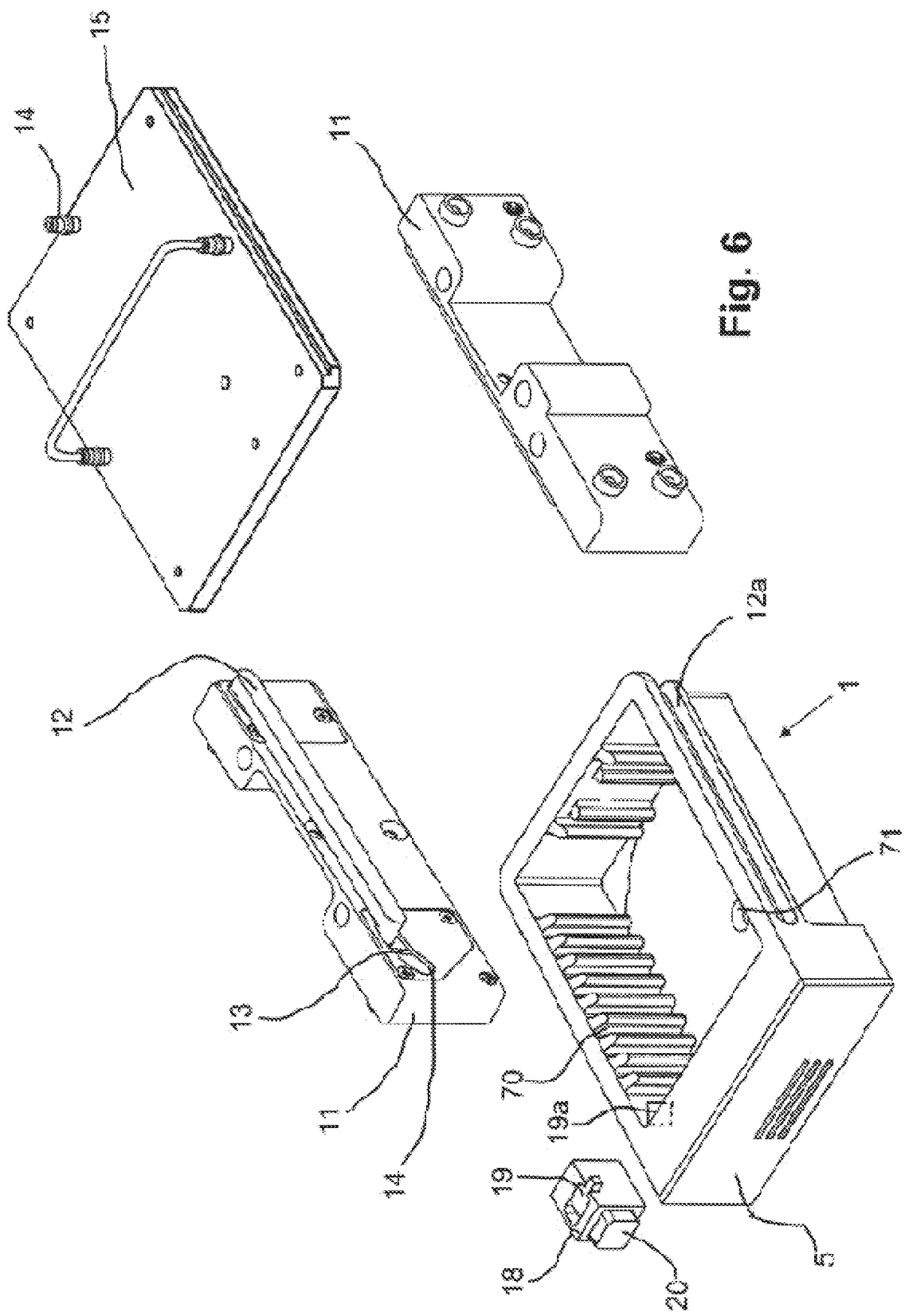
FIG. 6 shows a schematic perspective view of the assembly for moving and closing the coffee extraction chamber.

Below the details of the parts of the movable guide system are further explained. With particular reference to FIGS. 3 and 6, two movable guide assemblies (right-hand and left-hand) are provided, these comprising:

a support-piece (11) which acts as a frame for fixing to the machine the movement system comprising a movable guide (12) for the drawer (1), which has the function of guiding and supporting the said drawer inside the seat provided in the machine. A rocker-arm movement lever (13) cooperating with a hole in the form of a curved slot (13a) which has the function of allowing the movement of the guide (12) from the bottom upwards so as to bring the drawer into the working position, i.e. against the top spray plate (17) and the support plate (15).

The top spray plate (17) has the functions of: allowing the hot water to reach the pod; distributing it over the broadest possible area of the pod in order to increase the extraction quality; act as a top wall for the extraction chamber. In particular, the spray plate (17) cooperates with an inlet connector (14) for the hot water which is supplied from a heater and with a support plate (15) which acts as a lid for the drawer (1). A seal (16) is provided for sealing the chamber (5) so as to prevent spillage of the water/beverage during extraction.

Figure 5:
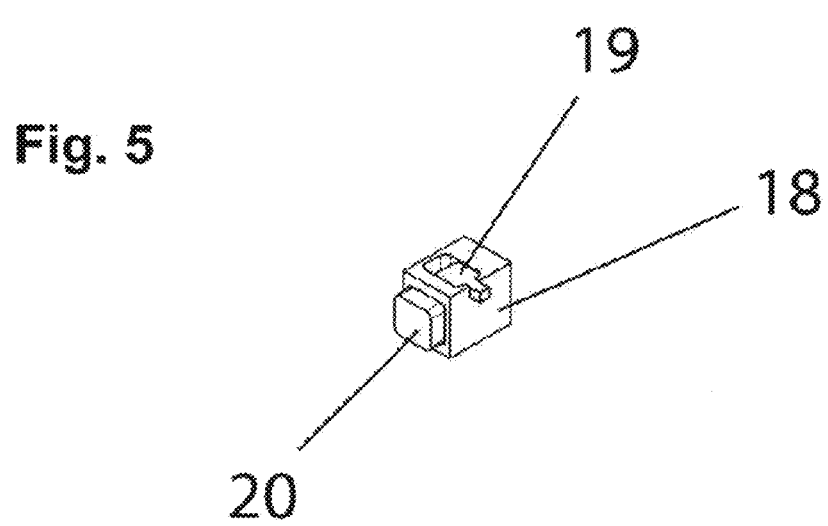
FIG. 5 shows a schematic perspective view of the drawer locking latch.
Figure 4:
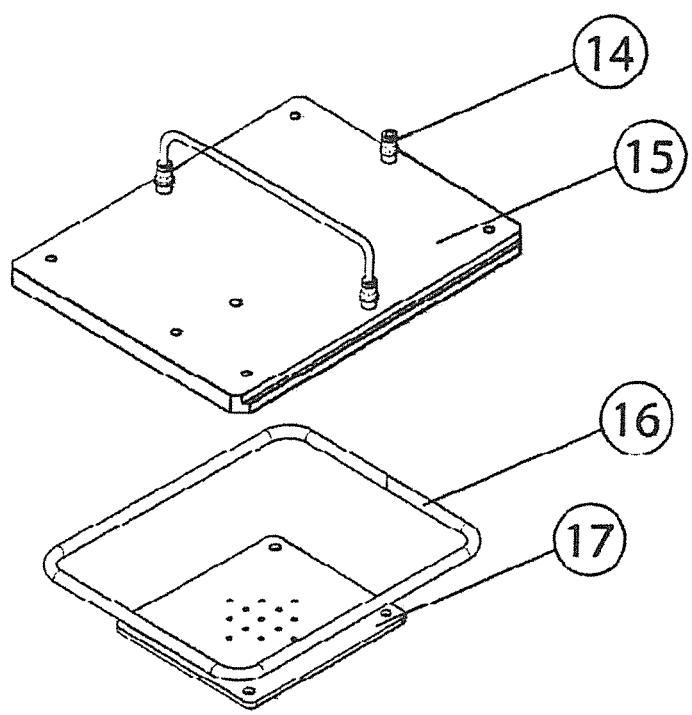
FIG. 4 shows a schematic perspective view of the top spray plate.

With particular reference to FIG. 5, the drawer (1) cooperates with a locking device (20) of the latch type which has the function of locking the said drawer both in its working position (drawer closed) during dispensing of the beverage and when the machine is in standby. This device comprises preferably a fixing frame (18), a locking pin (19) movable by the action of resilient means such as a spring or a control pushbutton (20).

Basically, when the drawer is slid into the closed position, the pin (19) contained in the fixing frame (18) slides backwards against the action of the resilient means until the drawer is in a position such that the pin (19) and corresponding hole (19a) provided on the drawer coincide. Once they coincide, under the thrusting force of the resilient means which lose compression, the pin (19) will engage inside the hole (19a). By operating the pushbutton (20) which causes the backward movement of the pin (19) the latter may be released so as to allow movement of the drawer.

System for Closing the Jug with Overflow Sensor

With particular reference to FIGS. 7-10, the machine according to the invention is provided with a mechanical lever system which allows the jug to be closed during dispensing by means of a lid (21) with hole opposite the beverage outlet hole (71). This ensures that, in the event of turbulent movement of the liquid, the contents of the jug do not spill out. The lid is also provided with an overflow sensor (22) known per se for preventing liquid from overflowing from the jug in the event of a new dispensing operation being performed by mistake when the jug is not empty.

Figure 8:
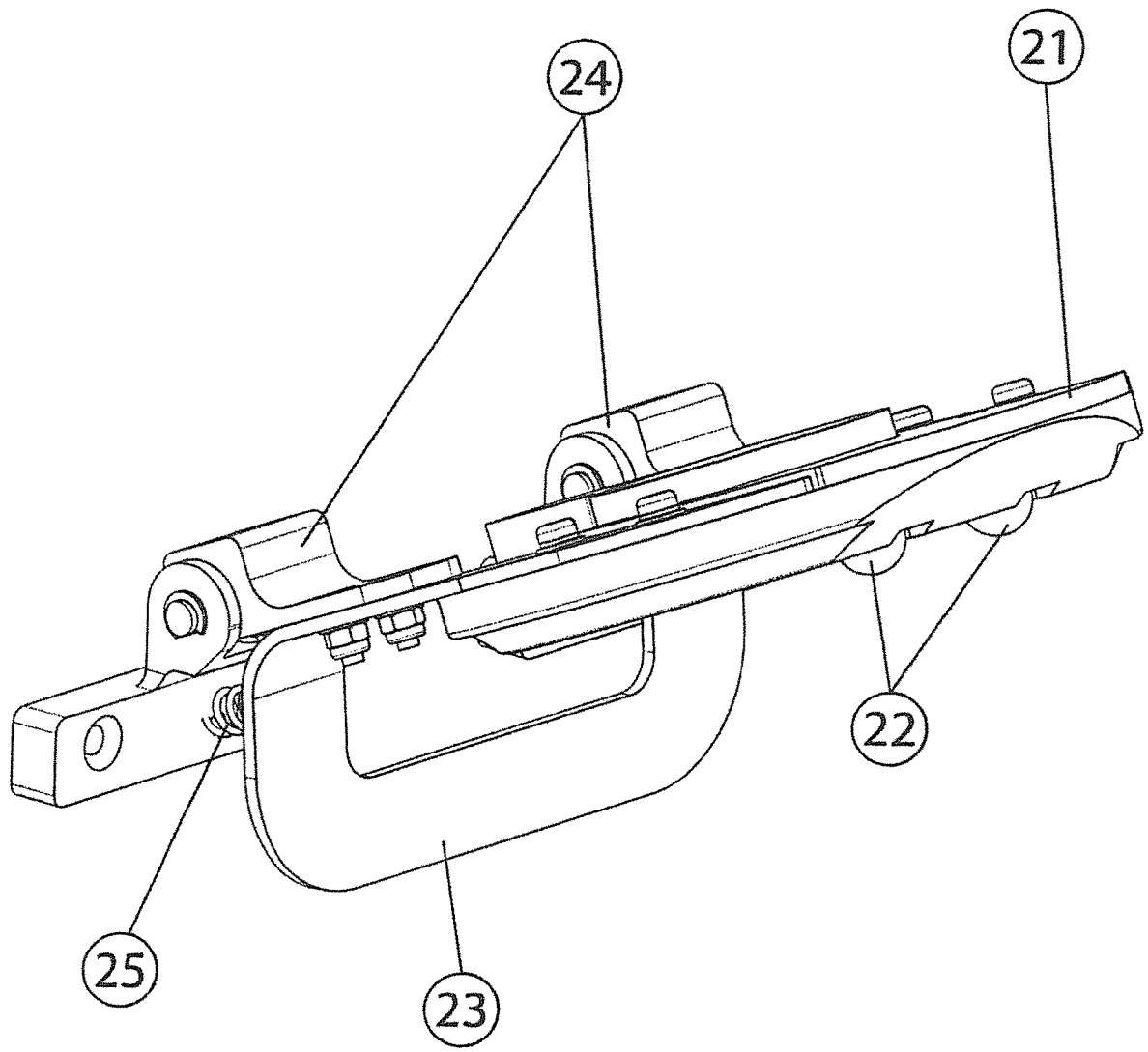
FIG. 8 shows a schematic perspective view of the jug lid assembly with overflow sensor.
Figure 9:
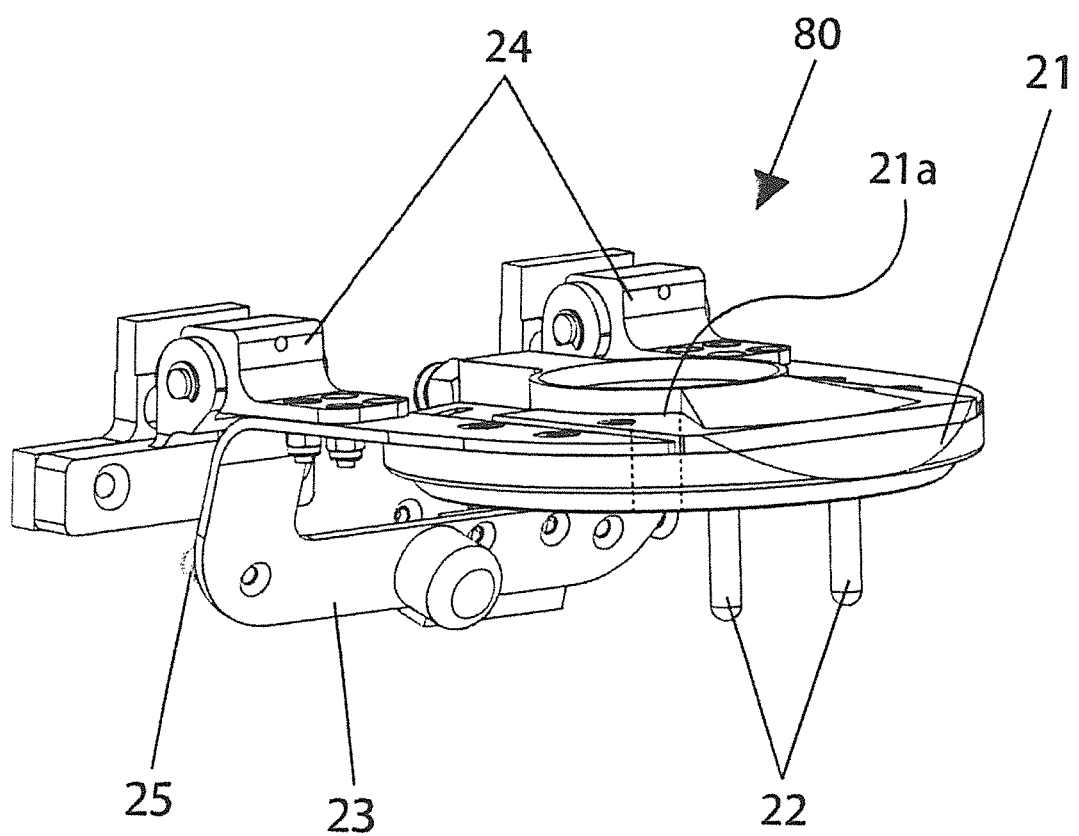
FIG. 9 shows a schematic perspective view of the jug lid assembly with a preferred design of an overflow sensor.
Figure 10:
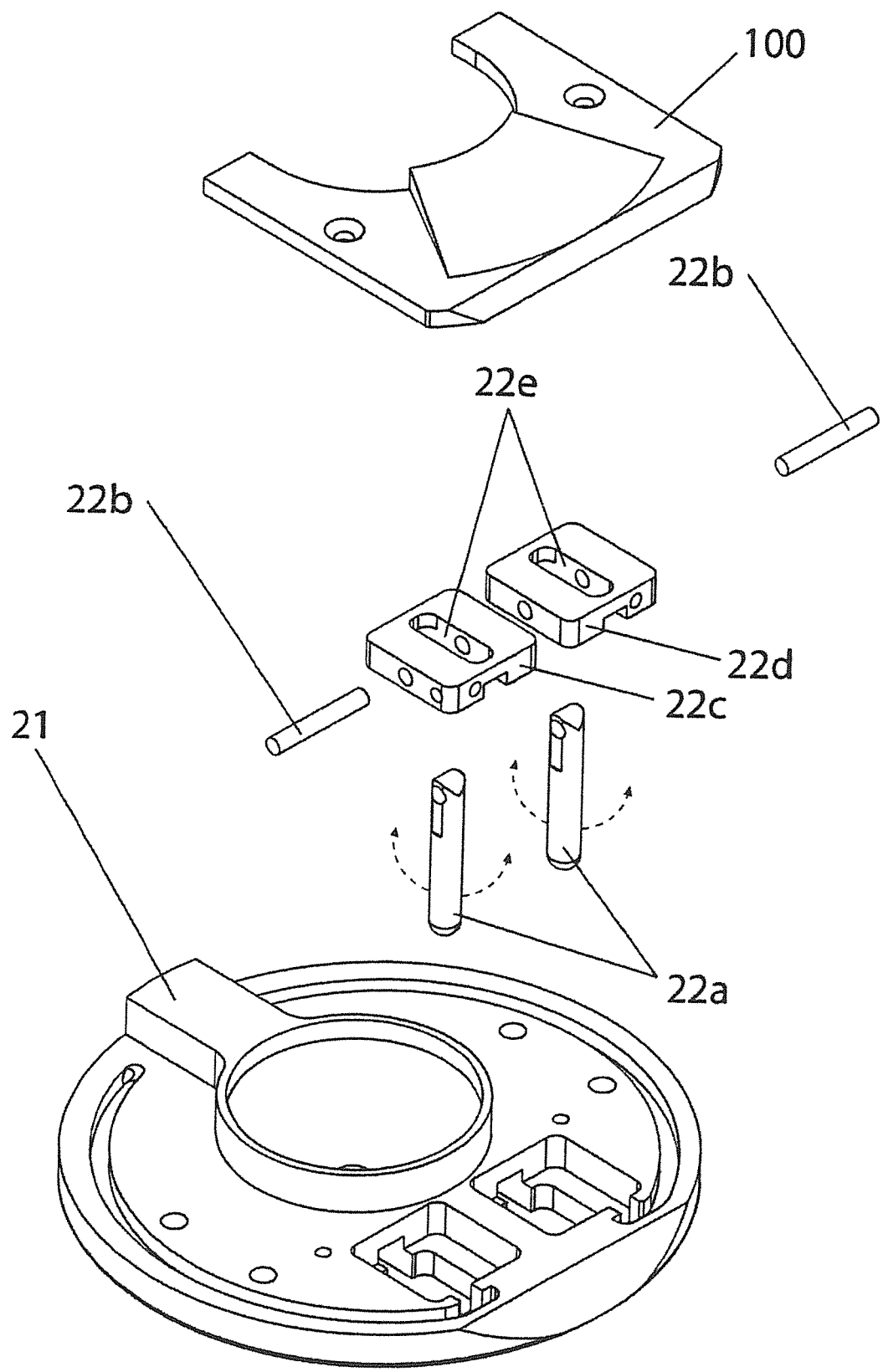
FIG. 10 shows a schematic exploded view of the lid (21) according to FIG. 9.

In a preferred embodiment shown in FIGS. 8 and 9, the overflow sensor comprises two conductors (22a) with an elongated form which may be fixed or movable relative to the lid (21) and to the closing lid 100. In the embodiment shown the two conductors (22a) are hinged with pins (22b) inserted in through-holes formed in the supports (22c and 22d) which are housed inside the compartments (22e). The conductors (22a) are fixed to the lid (21) by means of the corresponding supports (22c and 22d) and the whole assembly is sealed by means of the closing cover (100).

Operation of the overflow device is based on electrical conduction since electric current is made to flow in one of the two conductors (22a) by power supply means known per se, not shown, and if the level of the water inside the jug (75) reaches a height such as to enter into contact with the conductors (22a), the electrical circuit is closed because, since water itself is a conductor, current may pass between the conductors (22a) closing the circuit to earth.

The electronics of the machine to which the conductors are connected by means of the electric cables, not shown, may recognize the overflow condition and interrupt the flow.

Advantageously, in order to increase the efficiency of the conductors, the electric current is made to flow automatically, alternately in the two conductors, once in one direction and once in the other direction. In this way a greater reliability of the system is ensured. The closing system (80) comprises:

a jug lid (21) with hole, provided with overflow sensor (22), the hole (21a) being located opposite the hole (71) in the drawer (1). The lid (21) with hole has the function of closing the jug during use in order to prevent accidental spillage of liquid. The liquid overflow sensor, which functions by means of contact, is managed by means of a control software and interrupts dispensing of the beverage;

a fixing bracket (23) having the function of connecting the lid (21) to the movement hinges (24) so as to make use of the thrusting force imparted by the jug to the bracket (23) in order to position correctly the lid (21) with hole over the opening mouth of the jug;

at least one movement hinge (24) which, as a result of the pressure applied to the fixing bracket (23), allows rotation of the lid (21) from the raised position downwards, causing it to engage inside the opening mouth of the said jug;

at least one position spring (25) which causes the lid (21) to return into the rest position when no jug is present.

In detail, the operating principle of the closing system (80) is now described. When the user inserts the jug (75) into the appropriate seat present in the machine, the jug starts to press against the fixing bracket (23) which, being fixed to the lid (21), causes the downwards rotation of the said lid via the hinges (24). This movement is possible because the bracket (23) is in turn fixed to the machine by means of the hinges (24). Owing to this arrangement it is possible to lock the jug firmly together with the machine without additional mechanisms. When the jug is removed, the springs (25) move the lid (21) back into its raised rest position.

Bottom Jug Retention System with Quick-release Mechanism

Figure 7:
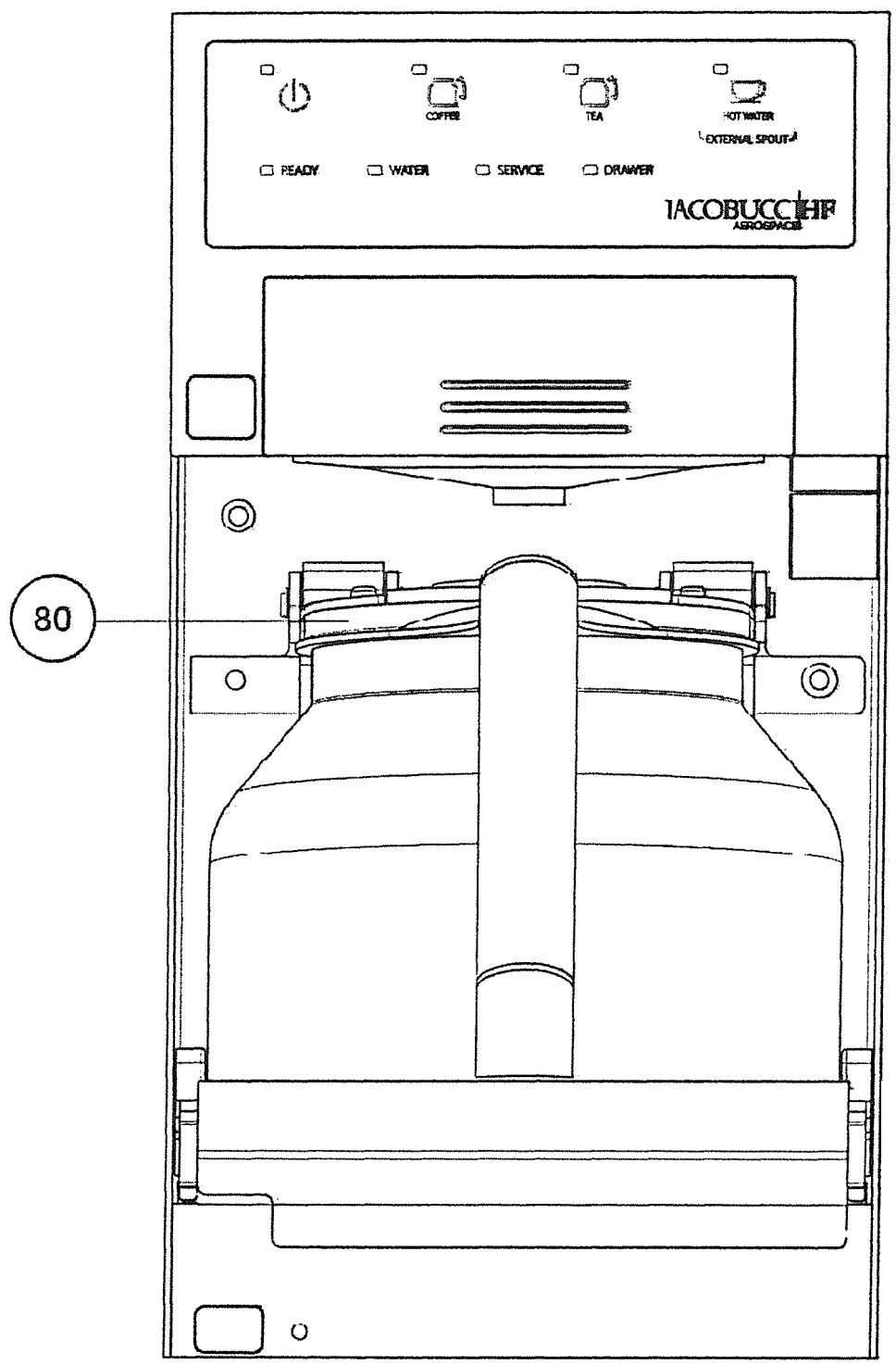
FIG. 7 shows in schematic form a front view of the machine including the jug and associated lid.
Figure 11:
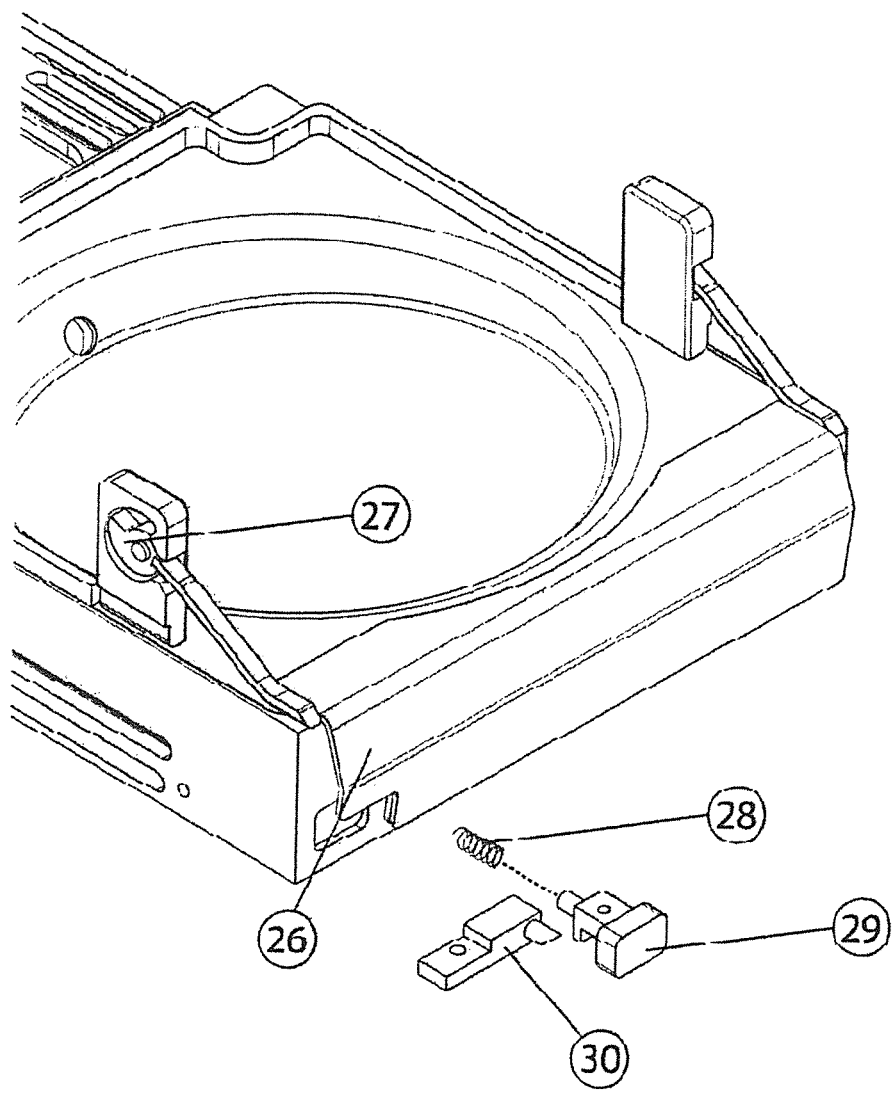
FIG. 11 shows a schematic perspective view of the jug retention system with quick-release device.

With particular reference to FIGS. 7 and 11, the jug (75) is locked by the closing system (80) once it has been inserted in the machine. In addition and for greater operational safety, it is possible to provide a further system for locking the bottom part of the jug (75) comprising a locking lever (26) hinged on spiral seats (27) provided with recall springs (not shown). During dispensing of the beverage, the locking lever (26) is raised so as to lock the jug (75) at a predetermined height. In order to release the jug the lever (26) is unlocked by operating a locking pushbutton (29) of the latch type, similar to that (20) described above, arranged in the seat (76) of the machine base. Unlocking is performed by simply operating the pushbutton (29) with spring (28) so as to allow the lever (26) to return into the lowered position where it does not interfere with the jug (75).

The illustrations contained in the figures are merely intended to be examples and a person skilled in the art may make variations or modifications which do not depart from the spirit and the scope of the invention. It is understood that these variations and modifications are included in the scope of the description and the claims.

The invention claimed is:

1. A beverage dispensing machine comprising:
   at least one water heating system;
   an extractable drawer (1) for housing a pod for a beverage to be reconstituted, the extractable drawer being provided with an anti-drip device;
   a closing device for closing the extractable drawer (1) having neither handles extending outwardly of the beverage dispensing machine, nor hydraulic closing systems, nor safety locks;
   an extractable beverage-holder jug (75);
   a device (80) for closing the jug during dispensing of the beverage; and
   a bottom jug retention system, which comprises a locking lever (26) hinged on spiral seats (27) so as to keep the jug stationary during dispensing of the beverage,
   wherein the extractable drawer (1) further comprises a seat (5) provided with grooves (70) defined along all walls of the extractable drawer (1) for favoring percolation of hot water through the pod, and a perforated bottom filter (6) having a plurality of holes,
   wherein the closing device comprises a system of movable guides comprising a guide support-piece (11), which acts as a fixing frame for guides (12), which slide inside slots (13a) in cooperation with rocker-arm movement levers (13) for moving the drawer (1) upwards during a closing operation.

2. The beverage dispensing machine according to claim 1, wherein the extractable drawer (1) is provided with an outlet hole (71) located on a bottom thereof for allowing the reconstituted beverage to pass into the jug (75) situated below and a lever system for opening and closing the outlet hole; and
   wherein said lever system comprises a movable pin (7) with a spring (8), which operates an arm (9) provided with support elements (9a) each inserted inside one of the grooves (70), which are situated opposite each other, and a ball (10) for closing an upper end of the hole (71), so as to allow the hole to be opened when the drawer is inserted in the beverage dispensing machine and closed when the drawer is opened.

3. The beverage dispensing machine according to claim 1, wherein the drawer (1) further comprises a latch-shaped locking device (18, 19, 20).

4. The beverage dispensing machine according to claim 1, wherein the drawer (1) further comprises a top spray plate (17) housed inside a support plate (15), which acts as a top wall of the drawer (1).

5. The beverage dispensing machine according to claim 1, wherein the device (80) for closing the jug comprises a lid (21) with a hole for the jug (75), movement hinges (24), a fixing bracket (23) which connects the lid (21) to the hinges (24), and at least one position spring (25).

6. The beverage dispensing machine according to claim 5, wherein the lid (21) is provided with an overflow sensor.

7. The beverage dispensing machine according to claim 6, wherein the overflow sensor comprises two conductors (22a) hinged with pins (22b) inserted in through-holes formed in supports (22c and 22d), which are housed in compartments (22e) formed in the lid (21).

8. The beverage dispensing machine according to claim 7, wherein the bottom jug retention system cooperates with a latch-shaped locking system (28, 29, 30).

9. The beverage dispensing machine according to claim 1, wherein the beverage dispensing machine is adapted to be used on an aircraft and in civil applications.

* * * * *